United States Patent [19]

Otsu et al.

[11] 4,114,461
[45] Sep. 19, 1978

[54] LEVER-OPERATED FEED DEVICE

[75] Inventors: Ikuo Otsu, Toyota; Akiyoshi Onishi, Hazu, both of Japan

[73] Assignee: Toyoda-Koki Kabushiki Kaisha, Japan

[21] Appl. No.: 789,735

[22] Filed: Apr. 21, 1977

[30] Foreign Application Priority Data

May 27, 1976 [JP] Japan .................................. 51-67804

[51] Int. Cl.$^2$ .............................................. F16H 19/04
[52] U.S. Cl. ........................................ 74/29; 308/3 A; 74/531
[58] Field of Search ............ 269/82; 308/3 A; 74/29, 74/30, 31

[56] References Cited

U.S. PATENT DOCUMENTS

| 800,685 | 10/1905 | Scoggins | 269/82 |
| 2,215,927 | 9/1940 | Hayes et al. | 269/82 |
| 3,233,949 | 2/1966 | Rieman et al. | 308/3 A |

FOREIGN PATENT DOCUMENTS 952,484  11/1956  Fed. Rep. of Germany ............. 269/82

*Primary Examiner*—Benjamin W. Wyche
*Assistant Examiner*—Wesley S. Ratliff, Jr.
*Attorney, Agent, or Firm*—Oblon, Fisher, Spivak, McClelland & Maier

[57] ABSTRACT

A lever-operated feed device is provided, in which a rotational sleeve, having a lever handle at one end thereof, is supported within a slide block for adjustably sliding the same along a guide way of a base through a rack-pinion mechanism. A rod, which operates a clamper to fix the block upon the base at an adjusted position, is extended through the rotational sleeve in co-axial alignment therewith. A clamp handle is secured upon one end of the rod near the lever handle of the sleeve so that the rotational manipulations of the lever handle and the clamp handle can be concentrically performed from a given place.

6 Claims, 1 Drawing Figure

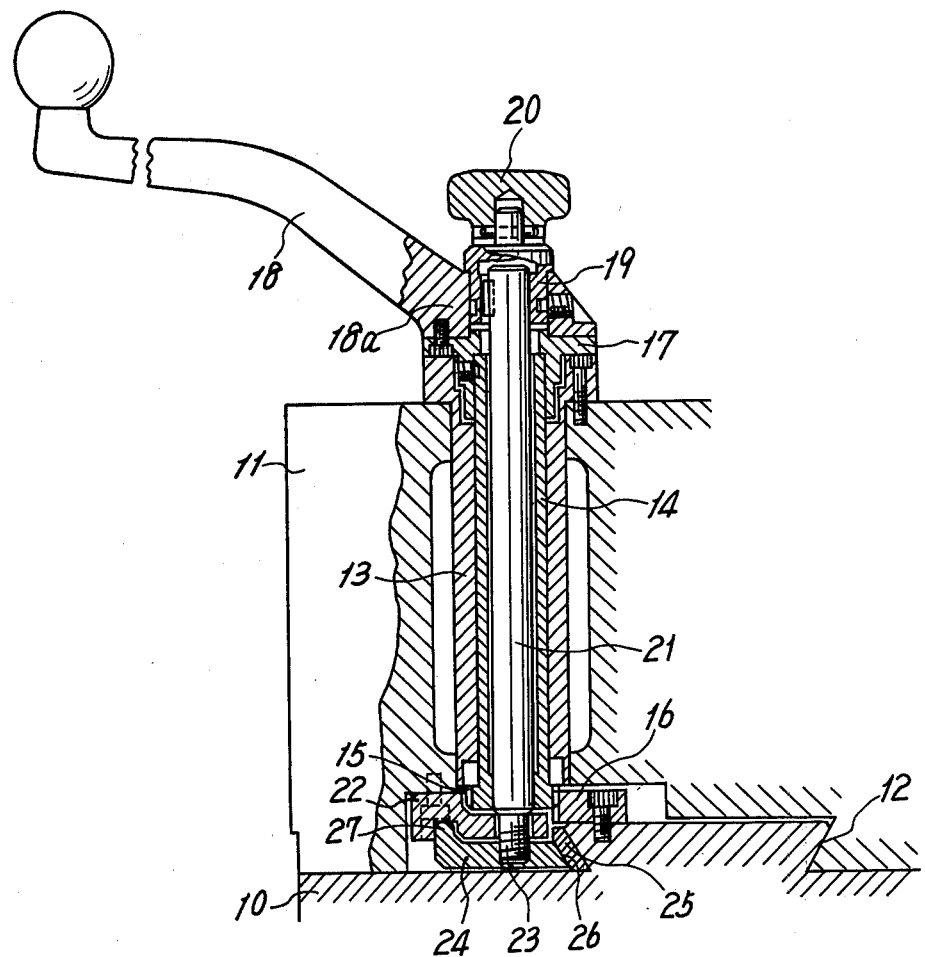

LEVER-OPERATED FEED DEVICE

BACKGROUND OF THE INVENTION

1. Field of the Invention

The present invention relates generally to a feed device of a lever-operated type and, more particularly, to such a device for sliding a slide block upon a base by manipulating a lever handle and for fixing the block thereon at a desired position.

2. Description of the Prior Art

In grinding machines of a certain type, there is provided a lever-operated feed device for a wheel head, in addition to an automatic feed device cooperating with a wheel handle. The lever-operated feed device conventionally has such a construction that a pinion shaft, which gears with a rack bar provided upon a stationary base, is rotated by manipulating a lever handle to move the wheel head, namely a slide block, and the slide block, after being moved a desired distance, is fixed upon the stationary base. However, as slide feed and fixing mechanisms of the prior art devices are disposed at respective positions remote from each other, the working property in the device is very poor. Also, in the device, the manipulation for fixing the slide block is liable to be forgotten or omitted frequently.

SUMMARY OF THE INVENTION

It is therefore an object of the present invention to provide an improved lever-operated feed device having enhanced working property.

Another object of the present invention is to provide an improved lever-operated feed device in which manipulations for slide feed and fixing can be performed concentrically from the same place.

A further object of the invention is to provide an improved device, as above, in which a lever handle is manipulated within such an angular extent as favored by an operator.

Briefly, according to the present invention, there is provided a lever-operated feed device, which comprises a rotational sleeve supported by a slide block slidable on a base, a stationary toothed member extending in the direction of the slide movement of the slide block, a rotational toothed member provided upon the sleeve to gear with the stationary toothed member, a lever handle for rotating the rotational sleeve, a rod rotatably supported by the slide block, a clamp member operated by the rod to clamp the slide block upon the base when the rod is rotated in one direction, and a clamp handle for reversibly rotating the rod.

The rod extends through the rotational sleeve in co-axial alignment therewith, and the clamp handle is provided at one end thereof near the lever handle of the sleeve. With this configuration, working property in the device is improved or enhanced because the lever handle and the clamp handle are concentrated in a given place upon the slide block.

BRIEF DESCRIPTION OF THE DRAWING

Various other objects, features and attendant advantages of the present invention will be more fully appreciated as the same becomes better understood from the following detailed description when considered in connection with the accompanying drawing, in which:

The sole illustration is a longitudinal sectional view of a device constructed according to the present invention.

DETAILED DESCRIPTION OF A PREFERRED EMBODIMENT

Referring now to the drawing, there is shown a base 10 on which a slide block 11 is mounted slidably along a dovetail slide way 12. The slide block 11 has a support cylinder 13 fixed thereto, within which a rotational sleeve 14 is inserted, being rotatably and axially slidably disposed therein. At the lowermost end of the sleeve 14, there is formed a rotational toothed member, or a pinion 15, disengageably gearing with a stationary toothed member, or a rack bar 16, which is fixed upon the base 10, extending along the dovetail slide way 12. The sleeve 14 is provided at its uppermost end with an annular connector 17, integrally connected thereto, upon which a lever handle 18 is secured. A cup member 19 is inserted into a root portion 18a of the lever handle 18, being rotatable relative thereto and disposed in axial alignment with the sleeve 14, and a clamp handle 20 is pin-fixed to the cup member 19. The relative axial movement of the cup member 19 to the lever handle 18 is restrained.

Extending axially through the sleeve 14 is a clamp rod 21, the uppermost end of which is key-engaged with the cup member 19 in such a manner as to be axially slidable relative thereto. At the lowermost end of the clamp rod 21, there is formed a screw portion 23, which is extended through a support member 22 fixed upon the slide block 11 and is threadedly engaged with a clamp member 24. The clamp member 24 is formed at one end thereof with an oblique surface 26, which abuts upon one of the oblique guide surfaces of the dovetail slide way 12 through a gib 25, and is formed at the other end thereof with a prominent portion 27, which is received within a depression formed upon the support member 22. It is therefore noted that the clamp member 24 has an L-letter form.

The lever-operated feed device according to the present invention is constructed as mentioned above, and when the lever handle 18 is rotationally manipulated, the pinion 15 engaging the stationary rack bar 16 is rotated, through the annular connector 17 and the sleeve 14, whereby the slide block 11 is moved along the dovetail slide way 12. When it is desired or needed to move the slide block 11 a long distance, the lever handle 18 is manipulated by one motion through the rotation of a considerable angle. Immediately after such a manipulation, the lever handle 18 is lifted up to release the pinion 15 from the gearing with the rack bar 16, under the condition of which the lever handle 18 is reversely manipulated without having any load. Then, the pinion 15 is again meshed with the rack bar 16, so that it is possible to manipulate the lever handle 18 within such an angular extent as favored by an operator. The release of the pinion 15 from the gearing with the rack bar 16 can also be carried out by lifting the clamp handle 20 up.

After being moved to a desired position in such a manner, the slide block 11 is fixed as follows: That is, the clamp handle 20 is manipulated to be rotated in one direction together with the cup member 19 and the clamp rod 21, and thus, the clamp member 24 is threadedly moved or pivoted with the prominent portion 27 acting as a fulcrum. Consequently, the oblique surface 26 of the clamp member 24 is pressed upon the one of the oblique guide surfaces of the dovetail slide way 12, so that the slide block 11 can be fixed upon the base 10.

It is, of course, noted that the manipulations for the slide adjustment and the fixing can be done independently of each other, in other words, without interfering with each other.

As described above, in the present invention, the clamp rod 21 is connected to the clamp handle 20 and is disposed in overlapping co-axial alignment with the sleeve 14 connected to the lever handle 18. With this configuration, working property in the device can be remarkably enhanced, in comparison with those in prior art devices, since it becomes possible to perform, at one place, manipulations for the slide adjustment and the fixing of the slide block 11.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A lever-operated feed device for moving a slide block slidably guided upon a base, comprising in combination:
   a stationary toothed member extending in the direction of the slide movement of said slide block;
   a rotational sleeve rotatably supported by said slide block;
   a rotational toothed member provided upon said rotational sleeve and meshingly engaged with said stationary toothed member for sliding said slide block when rotated;
   a lever handle provided at one end of said rotational sleeve for rotating the same together with said rotational toothed member;
   a rod extending through said rotational sleeve, being rotatable therein and being in co-axial alignment therewith;
   a clamp handle provided at one end of said rod for rotating the same; and
   means connected with said rod for clamping said slide block upon said base when said clamp handle is rotated in one direction and for unclamping said slide block therefrom when said clamp handle is rotated in the other direction.

2. A device as claimed in claim 1, wherein said rotational sleeve is axially slidably disposed in said slide block to release said rotational toothed member from meshing engagement with said stationary toothed member and is connected with said lever handle thereby to be moved axially.

3. A device as claimed in claim 2, wherein said clamp handle is rotatable relative to the lever handle, but is axially movable together therewith to allow axial movement of said rod, even when any one of said lever handle and said clamp handle is manipulated in the axial direction of said rod.

4. A device as claimed in claim 3, wherein said stationary toothed member and said rotational toothed member are, respectively, a rack bar and a pinion.

5. A device as claimed in claim 4, wherein said means connected with said rod comprises a screw portion provided upon said rod and a clamp member threadedly engaged with said screw portion and interposed between said base and said slide block so as to draw said slide block to said base when said rod is rotated in said one direction.

6. A device as claimed in claim 5, wherein a dovetail slide way is formed upon said base for guiding said slide block therealong, and wherein said clamp member is an L-letter member having at the ends thereof an oblique surface and a prominent portion which are brought into abutting engagements, respectively, with one of the guide surfaces of said slide way and with said slide block when said clamp handle is rotated in said one direction.

* * * * *